(12) United States Patent
Binette et al.

(10) Patent No.: US 8,883,062 B2
(45) Date of Patent: *Nov. 11, 2014

(54) MULTI-LAYERED GOLF BALLS HAVING A THIN OUTER COVER

(75) Inventors: Mark L. Binette, Mattapoisett, MA (US); Matthew F. Hogge, Plymouth, MA (US); Michael J. Sullivan, Barrington, RI (US)

(73) Assignee: Acushnet Company, Fairhaven, MA (US)

( * ) Notice: Subject to any disclaimer, the term of this patent is extended or adjusted under 35 U.S.C. 154(b) by 223 days.

This patent is subject to a terminal disclaimer.

(21) Appl. No.: 12/974,260

(22) Filed: Dec. 21, 2010

(65) Prior Publication Data

US 2011/0089607 A1    Apr. 21, 2011

Related U.S. Application Data

(63) Continuation-in-part of application No. 12/845,892, filed on Jul. 29, 2010, which is a continuation of application No. 11/738,537, filed on Apr. 23, 2007, now Pat. No. 7,789,775.

(51) Int. Cl.
| | |
|---|---|
| *B29C 41/20* | (2006.01) |
| *A63B 37/00* | (2006.01) |
| *A63B 45/00* | (2006.01) |
| *B29L 31/54* | (2006.01) |
| *B29C 37/00* | (2006.01) |

(52) U.S. Cl.
CPC ....... *A63B 37/0004* (2013.01); *B29L 2031/546* (2013.01); *B29C 2037/0039* (2013.01); *A63B 37/0024* (2013.01); *A63B 37/0031* (2013.01); *A63B 37/0033* (2013.01); *A63B 37/0043* (2013.01); *A63B 37/0045* (2013.01); *A63B 37/0074* (2013.01); *A63B 37/0076* (2013.01); *A63B 45/00* (2013.01); *A63B 37/0022* (2013.01); *A63B 37/0027* (2013.01); *A63B 37/0036* (2013.01); *A63B 37/0062* (2013.01); *A63B 37/0065* (2013.01); *A63B 37/0075* (2013.01); *A63B 37/008* (2013.01); *A63B 37/0083* (2013.01)
USPC ................................................... 264/279.1

(58) Field of Classification Search
CPC ............... B29C 2037/0039; B29L 2031/546
USPC ................................................... 264/279.1
See application file for complete search history.

(56) References Cited

U.S. PATENT DOCUMENTS

| | | | |
|---|---|---|---|
| 4,088,809 | A | 5/1978 | Elbing et al. |
| 4,264,075 | A | 4/1981 | Miller et al. |
| 5,480,726 | A | 1/1996 | Richart |
| 5,849,168 | A | 12/1998 | Lutz |
| 5,997,417 | A | 12/1999 | Lutz |
| 6,019,921 | A | 2/2000 | Lutz |

(Continued)

*Primary Examiner* — Robert J Grun
(74) *Attorney, Agent, or Firm* — Daniel W. Sullivan (57) ABSTRACT

Multi-layered golf balls having an inner core, at least one intermediate layer, and outer cover are provided. The outer cover is made from am ultra-low melt index (ULMI) thermoplastic material using an in-molding coating process that involves applying a thin layer of the material to the interior surface of the cover mold members. Preferably, the ultra-low melt index material is a highly neutralized ionomer ethylene-based copolymer. The cover layers made from these highly neutralized polymers (HNPs) are thin and uniform and provide the golf ball with good playing performance properties. Yet, the cover layers also are tough and provide the golf ball with good impact durability.

17 Claims, 3 Drawing Sheets

(56) References Cited

U.S. PATENT DOCUMENTS

| | | | |
|---|---|---|---|
| 6,068,797 A * | 5/2000 | Hunt | 264/1.7 |
| 6,606,332 B1 | 8/2003 | Boscha | |
| 6,632,147 B2 | 10/2003 | Cavallaro et al. | |
| 6,706,332 B1 | 3/2004 | Lutz et al. | |
| 6,783,808 B2 * | 8/2004 | Lutz et al. | 427/461 |

* cited by examiner

MULTI-LAYERED GOLF BALLS HAVING A THIN OUTER COVER

CROSS-REFERENCE TO RELATED APPLICATIONS

This application is a continuation-in-part of co-pending, co-assigned U.S. patent application Ser. No. 12,845,892 having a filing date of Jul. 29, 2010, which is a continuation of U.S. patent application Ser. No. 11/783,537 having a filing date of Apr. 23, 2007, now U.S. Pat. No. 7,789,775, the entire disclosures of which are hereby incorporated by reference.

BACKGROUND OF THE INVENTION

1. Field of the Invention

The present invention relates generally to a multi-layered golf ball having an inner core, at least one intermediate layer, and outer cover; wherein the outer cover is made from an ultra-low melt index (ULMI) thermoplastic material. The outer cover is made by an in-molding coating process that involves applying a thin layer of ULMI thermoplastic material to the interior surface of the cover mold members.

2. Brief Review of the Related Art

Today, golf balls having multi-layered designs are commonly used by professional and recreational golfers. For example, three-piece balls having an inner core, at least one intermediate layer surrounding the core, and an outer cover are popular. Different materials are used to make each of these layers. The materials are designed to impart more desirable playing performance properties to the golf ball.

For instance, a variety of materials may be used to make the inner core of the ball, particularly natural and synthetic rubbers such as styrene butadiene, polybutadiene, poly(cis-isoprene), and poly(trans-isoprene). The core is the primary source of resiliency for the golf ball and is often referred to as the engine of the ball. The ball may include one or more intermediate layers made from thermoplastic or thermoset resins such as polyamides, polyesters, ethylene-based ionomers, polyurethanes, and polyureas. As used herein, the term, "intermediate layer" means a layer of the ball disposed between the core and cover. The intermediate layer may be considered an outer core layer or inner cover layer or any other layer disposed between the inner core and outer cover of the ball. The intermediate layer also may be referred to as a casing or mantle layer. The intermediate layers are designed to impart special properties to the ball. For example, the intermediate layers often are made of materials that prevent moisture from penetrating into the core. An inner cover may be made of olefin-based ionomer copolymers that impart hardness to the ball. These polymers contain inter-chain ionic bonding and generally refer to ionic copolymers of an olefin such as ethylene and a vinyl comonomer having an acid group such as methacrylic or acrylic acid. Metal ions such as sodium, lithium, zinc, and magnesium are used to neutralize the acid groups in the copolymer. Commercially available ionomer resins are known in the industry and include numerous resins sold under the trademarks, Surlyn® (DuPont) and Escor® and Iotek® (Exxon). These ionomer resins are available in various grades and identified based on the type of base resin, molecular weight, type of metal ion, amount of acid, degree of neutralization, additives, and other properties.

The outer cover of the ball is designed to protect the core and provides the ball with durability, toughness, and cut/tear-resistance. The cover layer may be single or multi-layered. Conventional cover materials include polyurethanes, polyureas, and blends thereof, as well as olefin-based ionomer copolymers. The combination of core, intermediate layer(s), and cover provides the golf ball with its targeted performance properties.

For example, the resiliency or coefficient of restitution ("COR") of a golf ball (or golf ball subassembly such as a core) means the ratio of a ball's rebound velocity to its initial incoming velocity when the ball is fired out of air cannon into a rigid plate. The COR for a golf ball is written as a decimal value between zero and one. A golf ball may have different COR values at different initial velocities. The United States Golf Association (USGA) sets limits on the initial velocity of the ball so one objective of golf ball manufacturers is to maximize the COR under these conditions. Balls (or cores) with a higher rebound velocity have a higher COR value. Such golf balls rebound faster, retain more total energy when struck with a club, and have longer flight distance. In general, the COR of the ball will increase as the hardness of the ball is increased. The test methods for measuring the COR are described in further detail below.

It is well known that hard golf balls having relatively thick, hard outer covers can be made, and such balls generally have good durability, toughness, and impact-resistance. For example, hard ionomer resins can be used to make such covers. These thick-covered, ionomeric golf balls generally are harder and more resistant to wear and tear. The thick outer cover protects the core and such balls have good impact durability and cut/tear-resistance. However, these golf balls also can be overly stiff, and they tend to have low spin. Players tend to experience a harder feel when their club makes contact with such stiff balls. The player senses less control. The player has generally a less natural and comfortable sensation when striking such thick-covered, hard golf balls versus thin-covered, soft balls.

Thus, the golf industry has looked to develop golf balls having relatively thin cover layers. For example, golf balls having covers made from relatively soft polyurethanes, polyureas, and polyurethane/urea blends have been developed in recent years. For example, Hebert et al., U.S. Pat. Nos. 6,132, 324 and 5,885,172 disclose a method of forming a multi-layered golf ball comprising a core, inner cover layer, and outer cover layer. A castable reactive liquid polyurethane or polyurea material is introduced into mold cavities and then a ball subassembly (core and inner cover layer) is placed in one mold cavity. The upper and lower mold cavities are joined together. The polyurethane or polyurea material in the cavities encapsulates the ball subassembly and fauns a thin cover for the ball.

In Lutz et al., U.S. Pat. Nos. 6,783,808 and 6,706,332 a method of coating a thin-layered over a golf ball component is provided. The method involves providing a polymer material; creating a polymer particulate from the polymer material; fluidizing the polymer particulate; and coating the golf ball component with a thin layer of the polymer material by placing the golf ball component within the fluidized particulate. Suitable polymers are described as including vinyl resins; polyolefins; polyurethanes; polyureas; polyamides; acrylic resins; and other thermoplastics and thermosets.

Conventional thin covers provide the ball with a softer feel, and the player can place a spin on the ball and better control its flight pattern. The softer cover feels more natural. Players sense more control with such softer, relatively thin-covered golf balls. There are drawbacks, however, with such thin-covered golf balls, because the balls tend to have less durability, toughness, and cut/tear-resistance. The ball may appear excessively worn with scuff marks, cuts, and tears after continuous play on the golf course. In addition, there can be drawbacks with using conventional methods such as casting and reaction injection molding ("RIM") to form thin cover layers. For example, casting processes may produce undesirable waste, and RIM mold parts may be difficult to position to achieve a uniform layer and leave pin marks on the cores or golf ball subassemblies. Thin layers may also be sprayed on the golf ball assemblies; however, spray applicators or nozzles can be clogged and the liquid compositions to be sprayed may also have undesirably high volatile organic components (VOC).

It would be desirable to make thin covers for golf balls using ULMI polymers, because these polymers could provide the ball with a combination of optimum properties. For example, these polymers could provide the ball with high impact durability, toughness, and cut/tear-resistance. Such covers, in combination with the rubber cores, would impart high resiliency to the golf balls. This would allow players to generate greater initial ball velocity off the tee and achieve greater distance. At the same time, the relatively thin cover layers would provide the ball with a comfortable softness and natural feeling. However, manufacturing golf ball covers from ULMI thermoplastic polymers is particularly difficult because of the relatively poor flow characteristics of these materials. Conventional molding techniques, as discussed above, have various drawbacks.

The present invention provides new methods for making golf balls having cover layers made from ULMI thermoplastic polymers. The resulting balls having desirable playing performance properties as well as other benefits and advantages.

SUMMARY OF THE INVENTION

The present invention provides a method for molding a multi-layered golf ball using a powder composition comprising an ultra-low melt index (ULMI) thermoplastic polymer. The method involves the steps of: a) coating the powder composition to interior surfaces of upper and lower mold members which define a mold cavity; b) placing a golf ball subassembly comprising a core of at least one layer into the mold cavity; c) applying heat and pressure to the mold members so the powder composition fuses and encapsulates the subassembly and forms an outer cover; and d) removing the molded, multi-layered golf ball from the cavity. Ball subassemblies that may be coated with the ULMI polymer include, for example, a ball subassembly made of a single core, or a dual-core (inner core and outer core layer disposed about the inner core), or a core having more than two layers (for example, an inner core, intermediate core layer, and outer core layer), or a ball subassembly made of an intermediate layer disposed about a core (for example, inner cover layer disposed about a single core). The ULMI polymer may be a highly neutralized olefin-based ionomer. Preferably the acid groups of the ionomer polymer are neutralized greater than 70% and more preferably greater than 90%. Preferably, the ionomeric resin is a copolymer of α-olefin, $C_3$ to $C_8$ α, β-ethylenically unsaturated mono-or dicarboxylic acid, and optional softening monomer. More preferably, the ionomeric resin is an E/X/Y copolymer, wherein E is ethylene; X is a $C_3$ to $C_8$ α, β-ethylenically unsaturated mono- or dicarboxylic acid; and Y is a softening monomer. In a preferred embodiment, the copolymer is selected from the group consisting of ethylene/(meth)acrylic acid/n-butyl acrylate; ethylene/(meth)acrylic acid/ethyl acrylate; and ethylene/(meth)acrylic acid/methyl acrylate copolymers. The thin outer cover generally has a thickness of less than about 0.030 inches, preferably less than about 0.020 inches, and more preferably less than 0.010 inches.

In a second embodiment, at least two ULMI thermoplastic powders are applied to the mold cavity. A first ULMI thermoplastic powder is applied to the interior surface of the mold member to form a first layer of ULMI powder in the mold. Next, a second ULMI thermoplastic powder is applied over the first layer to form a second layer of ULMI powder in the mold. The first and second powder compositions may or may not be identical. In one embodiment, the first and second powder compositions each comprise an ionomer copolymer of α-olefin, $C_3$ to $C_8$ α, β-ethylenically unsaturated mono- or dicarboxylic acid, and optional softening monomer. The ionomer copolymer preferably contains greater than 16 weight percent acid groups. More preferably, the acid groups are neutralized greater than 70 weight percent. Heat and pressure are applied subsequently to the mold causing the first and second layers to blended together and form a single fused layer comprising the first and second ULMI materials. The fused layer is thus adhered to the golf ball subassembly.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description in connection with the accompanying drawings in which:

DETAILED DESCRIPTION OF THE INVENTION

The present invention relates to methods for making multi-layered golf balls having a relatively thin cover. The outer cover is made by an in-molding coating process. In general, this process involves applying a thin layer of ULMI thermoplastic powder to the interior surface of the mold members. A golf ball subassembly comprising a core of at least one layer (that is, the intermediate ball such as a core or casing layer/core combination) is placed into the mold and heat and pressure are applied to the mold. The ULMI powder fuses to form a solid, continuous cover layer that surrounds the core or casing/core. The term, "layer" as used herein means generally any spherical portion of a golf ball.

Composition of Cover Material

The cover of the golf ball of this invention is constructed using a powdered ultra-low melt index (ULMI) thermoplastic polymer. The melt index of a polymer generally refers to the melt viscosity of the polymer at a specified temperature and pressure and depends on its molecular weight. Higher molecular weight polymers tend to have a lower melt index and do not flow easily. More force is needed to extrude the polymer and make it flow. At elevated temperatures, these polymer tend to become tacky, but they are not sufficiently liquid and do not flow easily. Thus, the melt index or melt flow index of a material is inversely related to ordinary viscosity of the material. Resins having a relatively low viscosity (that is, the resin has low internal resistance and flows easily) will have a relatively high melt index. Conversely, resins having a relatively high viscosity (that is, the resin has high internal resistance and flows with difficulty) will have a relatively low melt index. By the term, "ultra-low melt index (ULMI) thermoplastic polymer," as used herein, it is meant a polymer having a melt index of less than about 1 gram per 10 minutes as determined by ASTM D1238 at 190° C. and 2.16 kilograms load.

Suitable ULMI materials that may be used in accordance with this invention include, but are not limited to, ionomer resins, and in particular ethylene-based ionomers. In general, suitable ionomer resins that may be used in the compositions of this invention are referred to as copolymers of α-olefin; $C_3$ to $C_8$ α, β-ethylenically unsaturated mono-or dicarboxylic acid; and optional softening monomer. The α-olefin is preferably ethylene or $C_3$ to $C_8$. These ionomers may be prepared by methods known in the art. Copolymers may include, without limitation, ethylene acid copolymers, such as ethylene/(meth)acrylic acid, ethylene/(meth)acrylic acid/maleic anhydride, ethylene/(meth)acrylic acid/maleic acid mono-ester, ethylene/maleic acid, ethylene/maleic acid mono-ester, ethylene/(meth)acrylic acid/n-butyl (meth)acrylate, ethylene/(meth)acrylic acid/iso-butyl (meth)acrylate, ethylene/(meth) acrylic acid/methyl (meth)acrylate, ethylene/(meth)acrylic acid/ethyl (meth)acrylate terpolymers, and the like. The term "copolymer," as used herein, includes polymers having two types of monomers, those having three types of monomers, and those having more than three types of monomers. Preferred α, (β-ethylenically unsaturated mono- or dicarboxylic acids are (meth) acrylic acid, ethacrylic acid, maleic acid, crotonic acid, fumaric acid, itaconic acid. (Meth) acrylic acid is most preferred. As used herein, "(meth) acrylic acid" means methacrylic acid and/or acrylic acid. Likewise, "(meth) acrylate" means methacrylate and/or acrylate.

When a softening monomer is included, such copolymers are referred to herein as E/X/Y-type copolymers, wherein E is ethylene; X is a $C_3$ to $C_8$ α, β-ethylenically unsaturated mono- or dicarboxylic acid; and Y is a softening monomer. The softening monomer is typically an alkyl (meth) acrylate, wherein the alkyl groups have from 1 to 8 carbon atoms. Preferred E/X/Y-type copolymers are those wherein X is (meth) acrylic acid and/or Y is selected from (meth) acrylate, n-butyl (meth) acrylate, isobutyl (meth) acrylate, methyl (meth) acrylate, and ethyl (meth) acrylate. More preferred E/X/Y-type copolymers are ethylene/(meth) acrylic acid/n-butyl acrylate, ethylene/(meth) acrylic acid/methyl acrylate, and ethylene/(meth) acrylic acid/ethyl acrylate.

The amount of ethylene or $C_3$ to $C_6$ α-olefin in the acid copolymer is typically at least 15 wt.%, preferably at least 25 wt.%, more preferably least 40 wt.%, and even more preferably at least 60 wt.%, based on the total weight of the copolymer. The amount of $C_3$ to $C_8$ α, β-ethylenically unsaturated mono- or dicarboxylic acid in the acid copolymer is typically from 1 wt.% to 35 wt.%, preferably from 5 wt.% to 30 wt.%, more preferably from 5 wt.% to 25 wt.%, and even more preferably from 10 wt.% to 20 wt.%, based on the total weight of the copolymer. The amount of optional softening comonomer in the acid copolymer is typically from 0 wt.% to 50 wt.%, preferably from 5 wt.% to 40 wt.%, more preferably from 10 wt.% to 35 wt.%, and even more preferably from 20 wt.% to 30 wt.%, based on the total weight of the copolymer. "Low acid" and "high acid" ionomeric polymers, as well as blends of such ionomers, may be used. In general, low acid ionomers are considered to be those containing 16 wt.% or less of acid moieties, whereas high acid ionomers are considered to be those containing greater than 16 wt.% of acid moieties.

Preferably, the acidic groups in the copolymeric ionomers are highly neutralized with a cation source to form a highly neutralized polymer (HNP). Suitable cation sources include metal cations and salts thereof, organic amine compounds, ammonium, and combinations thereof. Preferred cation sources are metal cations and salts thereof, wherein the metal is preferably lithium, sodium, potassium, magnesium, calcium, barium, lead, tin, zinc, aluminum, manganese, nickel, chromium, copper, or a combination thereof. More preferably, the metal cation is selected from lithium, sodium, magnesium, and zinc. The metal cation salts provide the cations capable of neutralizing (at varying levels) the carboxylic acids of the ethylene acid copolymer and fatty acids (if present.) These include, for example, the sulfate, carbonate, acetate, oxide, or hydroxide salts of the above-described metals. The amount of cation used in the composition is readily determined based on desired level of neutralization. For example, ionomeric resins having acid groups that are neutralized from about 10 percent to about 100 percent may be used. In one embodiment, the acid groups are partially neutralized. That is, the neutralization level is from about 10 to about 80%, more preferably 20 to 70%, and most preferably 30 to 50%. In another embodiment, the acid groups are highly or fully neutralized. That is, the neutralization level is from about 70 to about 100%, more preferably 90 to 100%, and most preferably 95 to 100%. In general, as the neutralization level increases, the stiffness of the ionomer increases. If the neutralization level is greater than about 70%, the melt flow of the ionomer resin becomes low and it generally is difficult to process the resin. Such HNPs, however, can be used to faun thin covers using the methods of this invention as described in further detail below.

Organic acids or salts of organic acids, particularly fatty acids, may be added to the ionomer resin to help make the composition more processable and increase resilience. This may be accomplished by melt-blending an ethylene α, β-ethylenically unsaturated carboxylic acid copolymer, for example, with an organic acid or a salt of organic acid, and adding a sufficient amount of a cation source to increase the level of neutralization of all the acid moieties (including those in the acid copolymer and in the organic acid) to greater than 90%, (preferably greater than 100%). The organic acids may be aliphatic, mono- or multi-functional (saturated, unsaturated, or multi-unsaturated) organic acids. Salts of these organic acids may also be employed. The salts of organic acids of the present invention include the salts of barium, lithium, sodium, zinc, bismuth, chromium, cobalt, copper, potassium, strontium, titanium, tungsten, magnesium, cesium, iron, nickel, silver, aluminum, tin, or calcium, and salts of fatty acids, particularly stearic, behenic, erucic, oleic, linoelic or dimerized derivatives thereof. It is preferred that the organic acids and salts be relatively non-migratory (they do not bloom to the surface of the polymer under ambient temperatures) and non-volatile (they do not volatilize at temperatures required for melt-blending.)

As described above, it is preferred that HNP ionomer resins be used as the ULMI materials in accordance with this invention. It is recognized, however, that lowly neutralized ionomers (for example, ionomers having a neutralization level less than 70%) may be used as well. Specific acid-containing ethylene copolymers include ethylene/acrylic acid, ethylene/methacrylic acid, ethylene/acrylic acid/iso-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include ethylene/methacrylic acid, ethylene/acrylic acid, ethylene/methacrylic acid/n-butyl acrylate, ethylene/acrylic acid/n-butyl acrylate, ethylene/methacrylic acid/methyl acrylate and ethylene/acrylic acid/methyl acrylate copolymers. The most preferred acid-containing ethylene copolymers are ethylene/methacrylic acid, ethylene/acrylic acid, ethylene/(meth) acrylic acid/n-butyl acrylate, ethylene/(meth)acrylic acid/ethyl acrylate, and ethylene/(meth) acrylic acid/methyl acrylate copolymers. The manner in which the ionomers are made is well known in the art as described in Rees, U.S. Pat. Nos. 3,264,269 and 3,317,631. Commercially available ionomer resins include numerous resins sold under the trademarks, Surlyn® (DuPont) and Escor® and Iotek® (Exxon). In some embodiments, cover layer includes a layer formed from a partially or fully neutralized ionomer composition, wherein the layer preferably has a Shore D hardness of 65 or less, or a Shore D hardness of less than 65, or a Shore D hardness of from 50 to 65, or a Shore D hardness of from 57 to 60, or a Shore D hardness of 58. Preferred ionomers include, but are not limited to, those selected from copolymers of a $C_3$ to $C_8$ α, β-ethylenically unsaturated mono- or dicarboxylic acid and ethylene or a $C_3$ to $C_6$ alpha-olefin, optionally including a softening monomer.

Other types of ULMI ionomeric and non-ionomeric materials suitable for use in the present invention include, for example, sulfonated, phosphonated, or carboxylated ionomers, polyurethane and polyurea ionomers, polypropylene ionomers, high molecular weight thermoplastic polyurethanes and polyureas, ultra-high molecular weight polyolefins, maleic anhydride grafted copolymers (such as Fusabond®), and sulfonated EPDM, polyamides, and polyamide/ionomer blends as well as lightly or partially cross-linked polymers. Blends of the foregoing materials also may be used. Such polymers can include materials cross-linked by means of electron beam, gamma irradiation, free-radical reactions (peroxide), sulfur-curing, and the like. In the case of ionomers, the melt index can be modified via neutralization level, cation source, molecular weight of the base copolymer, the addition of a fatty acid/fatty acid salt, and other typed of chemical or covalent modification including partial cross-linking as described above.

In a second method of this invention, at least two ULMI thermoplastic powders are applied to the mold. In this method, a first ULMI thermoplastic powder is applied to the interior surface of the mold member using a tribostatic, electrostatic, or fluidized process as described above. This first step forms a first layer of ULMI thermoplastic powder in the mold. Next, a second ULMI thermoplastic powder is applied over the first layer using these in-mold coating techniques. Thus, a second layer of ULMI thermoplastic powder is formed in the mold. The first layer forms a continuous phase that is separate and distinct from the second layer prior to the fusing step. The first and second layers of ULMI thermoplastic powder are discrete and independent at this point. In the next step, heat and pressure are applied to the mold so that the first and second layers are blended together to form a single fused layer comprising the first and second ULMI thermoplastic materials. This single layer contains a uniform mixture of first and second ULMI thermoplastic materials. The fused layer is adhered to the golf ball subassembly. As described above, the first and second ULMI thermoplastic powders are blended together to form a single layer of fused powders. The degree that the first and second ULMI thermoplastic powders are mixed together depends on many factors. For example, the melt flow index (MFI), chemical composition, miscibility, and methods for applying the powders to the mold surface will affect the mixing level.

The foregoing method has been described as applying first and second layers; however, it should be understood the process is not limited to only two layers. Any number of layers of ULMI thermoplastic powder can be applied to the interior surfaces of the mold members in accordance with this invention.

Composition of Core

The core of the golf ball may be solid, semi-solid, fluid-filled, or hollow; and the core may have a single-piece or multi-piece structure. In this invention, solid cores are preferably used and the core is made from a rubber composition containing a base rubber, free-radical initiator agent, cross-linking co-agent, and fillers. The base rubber may be selected, for example, from polybutadiene rubber, polyisoprene rubber, natural rubber, ethylene-propylene rubber, ethylene-propylene diene rubber, styrene-butadiene rubber, and combinations of two or more thereof. A preferred base rubber is polybutadiene. Another preferred base rubber is polybutadiene optionally mixed with one or more elastomers such as polyisoprene rubber, natural rubber, ethylene propylene rubber, ethylene propylene diene rubber, styrene-butadiene rubber, polystyrene elastomers, polyethylene elastomers, polyurethane elastomers, polyurea elastomers, metallocene-catalyzed elastomers, and plastomers. The base rubber typically is mixed with at least one reactive cross-linking co-agent to enhance the hardness of the rubber composition. Suitable co-agents include, but are not limited to, unsaturated carboxylic acids and unsaturated vinyl compounds. A preferred unsaturated vinyl is trimethylolpropane trimethacrylate.

The rubber composition is cured using a conventional curing process. Suitable curing processes include, for example, peroxide-curing, sulfur-curing, high-energy radiation, and combinations thereof. In one embodiment, the base rubber is peroxide-cured. Organic peroxides suitable as free-radical initiators include, for example, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. Cross-linking agents are used to cross-link at least a portion of the polymer chains in the composition. Suitable cross-linking co-agents include, for example, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. In a particular embodiment, the cross-linking co-agent is selected from zinc salts of acrylates, diacrylates, methacrylates, and dimethacrylates. In another particular embodiment, the cross-linking agent is zinc diacrylate ("ZDA"). Commercially available zinc diacrylates include those selected from Rockland React-Rite and Sartomer.

The rubber compositions also may contain "soft and fast" agents such as a halogenated organosulfur, organic disulfide, or inorganic disulfide compounds. Particularly suitable halogenated organosulfur compounds include, but are not limited to, halogenated thiophenols. Preferred organic sulfur compounds include, but not limited to, pentachlorothiophenol ("PCTP") and a salt of PCTP. A preferred salt of PCTP is ZnPCTP. A suitable PCTP is sold by the Struktol Company (Stow, Ohio) under the tradename, A95 ZnPCTP is commercially available from EchinaChem (San Francisco, Calif.). These compounds also may function as cis-to-trans catalysts to convert some cis-1, 4 bonds in the polybutadiene to trans-1, 4 bonds. Antioxidants also may be added to the rubber compositions to prevent the breakdown of the elastomers. Other ingredients such as accelerators (for example, tetra methylthiuram), processing aids, dyes and pigments, wetting agents, surfactants, plasticizers, as well as other additives known in the art may be added to the rubber composition. The core may be formed by mixing and forming the rubber composition using conventional techniques. These cores can be used to make finished golf balls by surrounding the core with intermediate layer(s) and/or cover materials per the methods of this invention.

Golf balls made in accordance with this invention can be of any size, although the USGA requires that golf balls used in competition have a diameter of at least 1.68 inches and a weight of no greater than 1.62 ounces. For example, the diameter of the golf ball may be in the range of about 1.68 to about 1.80 inches. For play outside of USGA competition, the golf balls can have smaller diameters and be heavier. In one embodiment, the core is a single-piece having an outside diameter of about 1.00 to about 1.65 inches. Preferably, the single-piece core has a diameter of about 1.50 to about 1.64 inches. The core generally makes up a substantial portion of the ball, for example, the core may constitute at least about 90% of the ball. The hardness of the core may vary depending upon desired properties of the ball. In general, core hardness is in the range of about 30 to about 90 Shore D and more preferably in the range of about 35 to about 60 Shore D. The compression of the core is generally in the range of about 40 to about 110 and more preferably in the range of about 70 to about 100. In another embodiment, the core is made up of two pieces. The inner core may be made of a first rubber material and the outer core layer may be made of a second rubber material.

Composition of Intermediate Layer

As discussed above, the intermediate layer may be considered an outer core layer or inner cover layer or any other layer disposed between the inner core and outer cover of the ball for purposes of this invention. The intermediate layer also may be referred to as a casing or mantle layer. The intermediate layer preferably has water vapor barrier properties to prevent moisture from penetrating into the rubber core. The ball may include one or more intermediate layers. For example, in FIGS. 3 and 4, each of the respective intermediate layers (22, 28) is made of a conventional thermoplastic or thermosetting composition, while the respective outer cover layers (20, 32) are made of the ULMI materials of this invention.

Suitable conventional theimoplastic compositions that can be used to make the intermediate layers include, but are not limited to, partially- and fully-neutralized ionomers, graft copolymers of ionomer and polyamide, and the following non-ionomeric polymers: polyesters; polyamides; polyamide-ethers, and polyamide-esters; polyurethanes, polyureas, and polyurethane-polyurea hybrids; fluoropolymers; non-ionomeric acid copolymers, such as E/Y- and E/X/Y-type copolymers, wherein E is an olefin (e.g., ethylene), Y is a carboxylic acid, and X is a softening comonomer such as vinyl esters of aliphatic carboxylic acids, and alkyl alkylacrylates; metallocene-catalyzed polymers; polystyrenes; polypropylenes and polyethylenes; polyvinyl chlorides and grafted polyvinyl chlorides; polyvinyl acetates; polycarbonates including polycarbonate/acrylonitrile-butadiene-styrene blends, polycarbonate/polyurethane blends, and polycarbonate/polyester blends; polyvinyl alcohols; polyethers; polyimides, polyetherketones, polyamideimides; and mixtures of any two or more of the above thermoplastic polymers. Examples of commercially available thermoplastics include, but are not limited to: Pebax® thermoplastic polyether block amides, commercially available from Arkema Inc.; Surlyn® ionomer resins, Hytrel® thermoplastic polyester elastomers, and ionomeric materials sold under the trade names DuPont® HPF 1000 and HPF 2000, all of which are commercially available from E. I. du Pont de Nemours and Company; Iotek® ionomers, commercially available from ExxonMobil Chemical Company; Amplify® IO ionomers of ethylene acrylic acid copolymers, commercially available from The Dow Chemical Company; Clarix® ionomer resins, commercially available from A. Schulman Inc.; Elastollan® polyurethane-based thermoplastic elastomers, commercially available from BASF; and Xylex® polycarbonate/polyester blends, commercially available from SABIC Innovative Plastics.

The compositions constituting the core, intermediate layers, and cover of the golf ball of this invention may contain additives, ingredients, and other materials in amounts that do not detract from the properties of the final composition. These additive materials include, but are not limited to, activators such as calcium or magnesium oxide; fatty acids such as stearic acid and salts thereof; fillers and reinforcing agents such as organic or inorganic particles, for example, clays, talc, calcium, magnesium carbonate, silica, aluminum silicates zeolites, powdered metals, and organic or inorganic fibers, plasticizers such as dialkyl esters of dicarboxylic acids; surfactants; softeners; tackifiers; waxes; ultraviolet (UV) light absorbers and stabilizers; antioxidants; optical brighteners; whitening agents such as titanium dioxide and zinc oxide; dyes and pigments; processing aids; release agents; and wetting agents.

Methods of Manufacturing Covers

The layer comprising the ULMI thermoplastic polymer powder is adhered to at least one part of a multi-part golf ball mold using a tribostatic process, an electrostatic process, or a fluidized bed process or combinations thereof. Preferably, the layer of ULMI thermoplastic polymer powder is adhered to each part of the multi-part golf ball mold. Any suitable type of golf ball mold can be used including injection and compression type molds. In one preferred embodiment, a two-part golf ball compression mold is used.

In the electrostatic process, a corona electrostatic spray gun is used to apply the ULMI powder from a feed hopper by utilizing the electrostatic charge of the powder particles. The corona gun utilizes a voltage supply to charge the powder particles, thereby negatively charging the particles. This generates electric fields, which can cause the particles to coat the surface of the mold evenly. On the other hand, the tribostatic process utilizes a tribo electrostatic spray gun that uses friction generated within the gun barrel. The tribo gun positively charges the particles, resulting in even coating of the powder. Suitable methods for utilizing corona and tribo spray guns are known and available in the art.

The fluidized bed process immerses the golf ball mold parts in a fluidized bed of the ULMI powder. The powder is placed in a reservoir, such as an open-top immersion tank. Any suitable method for grinding the ULMI thermoplastic polymer into a powder can be used. Suitable sizes for the particles of powder include, but are not limited to, less than about 100μm, preferably less than about 75μm and more preferably less than about 50μm. The reservoir containing the powder is "fluidized" by injecting low pressure, dry compressed air through a porous diffuser plate or manifold at the bottom of the reservoir. Injection pressures preferably range from about 5 psig to about 15 psig, and the dew point is typically controlled, preferably kept below 30° F. While any air flow rate is acceptable, an air flow rate on the order of about 5 cubic feet per minute per square foot of diffuser plate is preferred. In one embodiment, air is introduced into the reservoir and percolates up through the powder to ensure particle separation. In this way, the powder entrained with air has a substantial density reduction and takes on the consistency of a "fluid" so that the mold parts can be freely "dipped" into and lifted out of the "fluidized powder bed."

The ULMI powder can be charged positively or negatively. In one embodiment of the present invention, the mold parts to be coated are charged (and optionally heated) prior to entering the fluidized bed for electrostatic coating with the charged powder. In another embodiment of the present invention, the mold parts to be coated are grounded (and optionally heated) prior to entering the fluidized bed for electrostatic coating with charged powder. Any number of methods may be used to electrostatically charge either the mold parts or the powder (if necessary). One method of coating the mold when the mold needs help holding the charge is to coat the mold with a metal salt solution, such as RansPrep™, commercially available from Chemical Technology Co., disclosed in U.S. Pat. No. 6,706,332, which is incorporated herein by reference in its entirety.

In one embodiment, adhesion of the ULMI powder to the golf ball mold parts is facilitated by grounding the mold parts by any suitable method and applying a voltage, preferably a negative voltage (e.g., 10-20 kV), to the powder, typically via a set of electrodes positioned near the air diffuser plate. The resultant electrostatic field causes the powder at the top of the fluidized bed to leave the bed to form a "cloud" of charged powder. Golf ball mold parts conveyed through the powder cloud attract the charged particles, which adhere to their surfaces.

Figure 1:
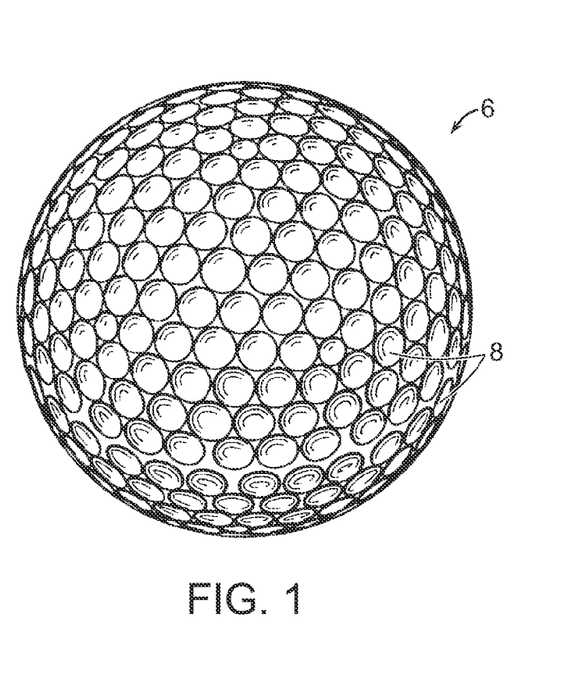
FIG. 1 is a front view of a multi-layered dimpled golf ball made in accordance with the present invention.
Figure 2:
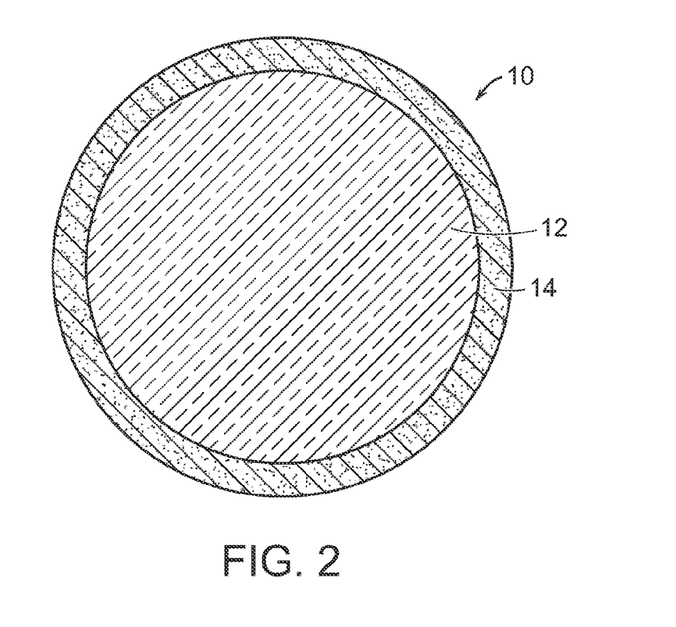
FIG. 2 is a cross-sectional view of a two-piece golf ball having a cover made of a ULMI thermoplastic polymer in accordance with the present invention.
Figure 3:
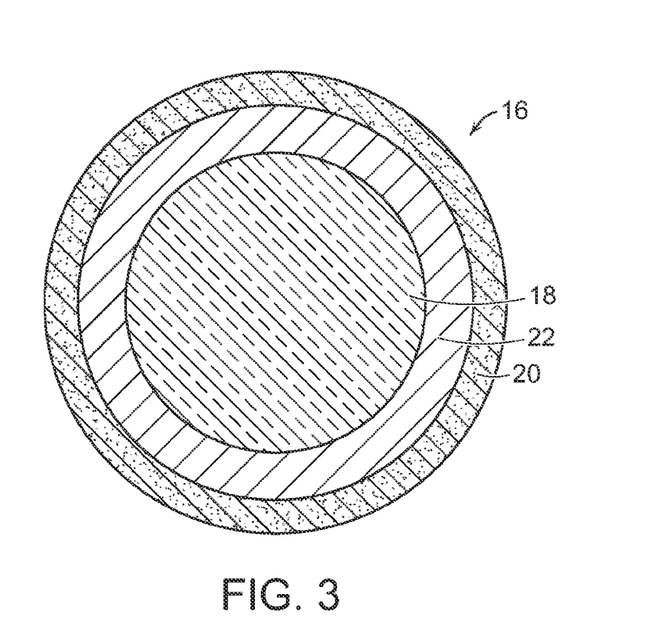
FIG. 3 is a cross-sectional view of a three-piece golf ball having a cover made of a ULMI thermoplastic polymer in accordance with the present invention.
Figure 4:
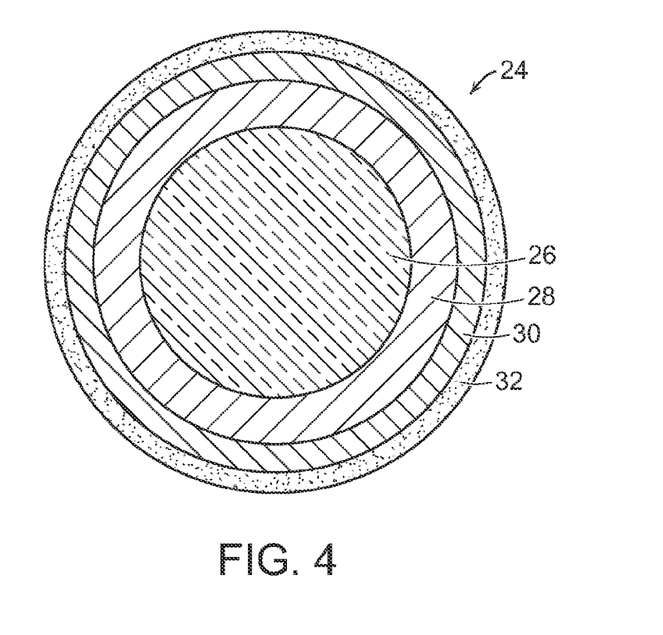
FIG. 4 is a cross-sectional view of a four-piece golf ball having an outer cover made of a ULMI thermoplastic polymer in accordance with the present invention.

Referring to FIG. 1, one version of a golf ball that can be made in accordance with this invention is generally indicated at (6). Various patterns and geometric shapes of dimples (8) are used to modify the aerodynamic properties of the golf ball (6). The dimples (8) can be arranged on the outer surface of the ball (6) according to any suitable configuration. In FIG. 2, a cross-sectional view of a two-piece golf ball (10) having a solid inner core (12) and outer cover (14) made of the ULMI polymer composition of this invention is shown. The outer cover (14) contains numerous dimples as shown in FIG. 1. To make the finished golf ball, the cover can be painted white or another color. First, a primer coat can be applied to the cover and then a pigmented paint can be applied over the primer. Typically, a custom logo, symbol, or other mark is ink-printed onto the painted surface and a clear, protective top coat is applied over the printed mark to provide a glossy finish. In other instances, the cover material may contain white pigment or a different colored concentrate. In FIG. 3, a cross-sectional view of a three-piece golf ball (16) having a solid core (18) and cover (20) made of the ULMI polymer composition of this invention is shown. An intermediate layer (22) is disposed between the core (18) and cover layer (20). Turning to FIG. 4, a golf ball (24) having a multi-layered cover is shown. The golf ball (24) includes a solid core (26) and intermediate layer (28). The inner cover layer (30) is made of a conventional thermoplastic or thermoset polymer composition, while the outer cover (32) is made of the ULMI polymer composition of this invention.

Figure 5:
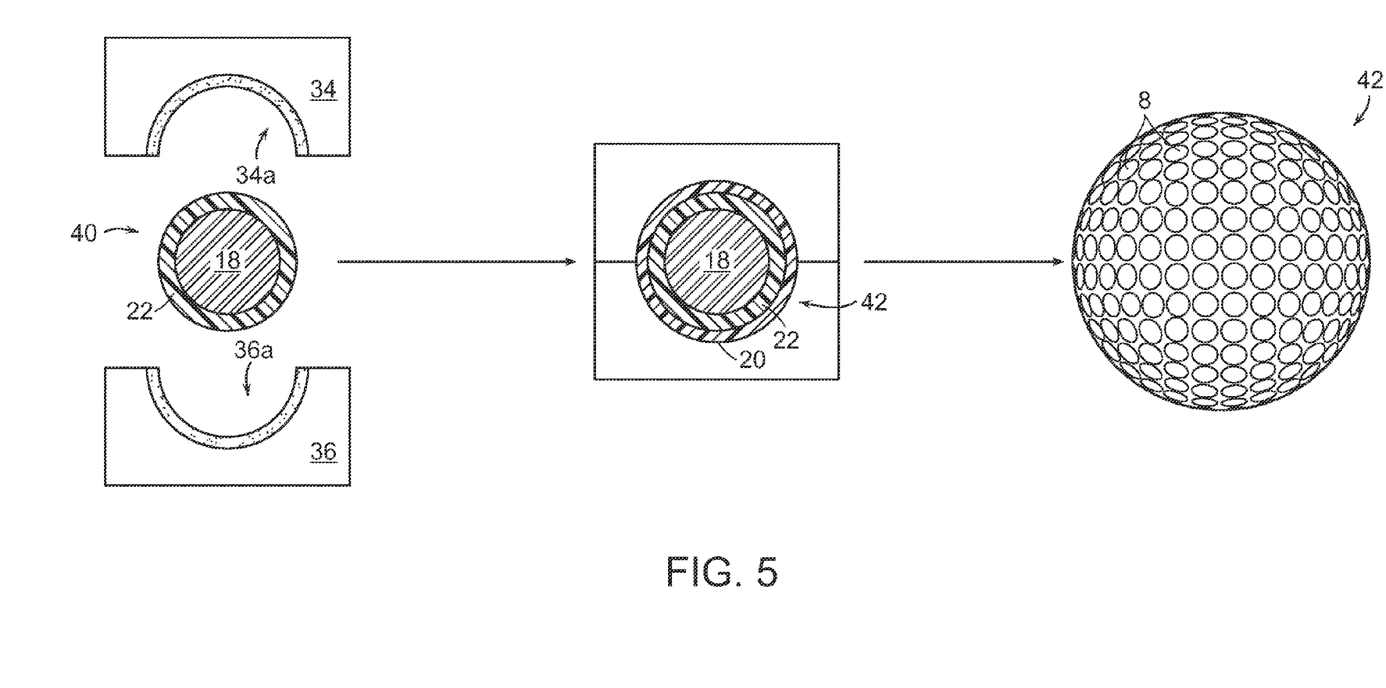
FIG. 5 is a schematic diagram showing one embodiment for making a molded golf ball in accordance with the present invention.

As illustrated in FIG. 5, the in-mold powder coating process of this invention involves coating a powder composition (33) comprising an ultra-low melt index thermoplastic polymer to the interior surfaces of an upper mold member (34) and lower mold member (36). Each mold member has a cavity (34a, 36a). The mold members (34, 36) are joined together so their mold cavities (34a, 36a) define a mold cavity for holding a golf ball subassembly (40). In FIG. 5, the golf ball subassembly (40) includes a solid core (18) surrounded by a casing (22). The core (18) can be made of a polybutadiene rubber and the casing (22) can be made of an ionomer resin. The ball subassembly (40) is placed into the mold cavity defined by the upper and lower mold halves (34, 36). This step can be performed manually or automatically by machine Next, the mold members (34, 36) are joined and a sufficient amount of heat and pressure is applied to the mold so the powder composition fuses and encapsulates the ball subassembly (40). Thus, an outer cover (20) comprising an ultra-low melt index thermoplastic polymer is formed. The resulting molded golf ball (42) is preferably cooled before it is removed from the mold. The dimples (8) located on the surface of the golf ball (42) are formed by projections in the mold members (34, 36) as is known in the art.

Additional steps can be performed in the molding process if desired. For example, excess ULMI polymer powder can be removed, for example, by vacuuming, and the powder can be reclaimed and reused. Also, the golf ball cores or subassemblies can be pre-heated to about 100° to 175° F. if their temperature falls below this range prior to being molded. In addition, to facilitate the adhesion of the ULMI polymer powder to the cores or subassemblies or mold parts, the mold parts or the golf cores/subassemblies can be treated with corona treatment, plasma treatment or chemical treatment. A coupling agent, such as amino-silane, commercially available from OSI Specialty Chemicals, can also be used to improve adhesion. Alternatively, instead of the corona, plasma or chemical treatments, the mold parts or the golf cores/subassemblies can be mechanically agitated by vibrating, tumbling, brushing or abrading to improve adhesion to the powder.

Golf Ball Construction

Golf balls made in accordance with this invention can be of any size, although the United States Golf Association (USGA) requires that golf ball used in competition have a diameter of at least 1.68 inches. For play outside of USGA competition, the golf balls can have smaller diameters. Preferably, the diameter of the golf ball is in the range of about 1.68 to about 1.80 inches. The core will generally have a diameter in the range of about 1.26 inches to about 1.60 inches. The range of thicknesses for the intermediate layer(s) may vary. In general, the thickness of the intermediate layers will be about 0.120 inches or less. Particularly, in one preferred embodiment, the intermediate layer has a thickness in the range of about 0.010 to about 0.030 inches and more preferably about 0.015 to about 0.025 inches. Preferably, the overall diameter of the core and intermediate layers is about 90 percent to about 98 percent of the overall diameter of the finished ball. The outer cover layers made of the ULMI polymer compositions of this invention are relatively thin and the diameter of the outer cover layer preferably is less than 2% of the overall diameter of the finished ball.

The golf ball of this invention may have single-, dual-, or multi-layered covers preferably having an overall thickness within a range having a lower limit of 0.010 or 0.015 or 0.020 or 0.025 or 0.030 or 0.035 or 0.040 or 0.045 inches and an upper limit of 0.020 or 0.025 or 0.030 or 0.035 or 0.040 or 0.045 or 0.050 or 0.060 or 0.070 or 0.080 or 0.090 or 0.100 or 0.150. Preferably, the thickness of the outer cover is 0.030 inches or less, more preferably 0.020 inches or less, and most preferably 0.015 inches or less. The outer cover preferably has a material hardness of 70 Shore D or less, or 65 Shore D or less, or 60 Shore D or less, or 55 Shore D or less. Preferably, the outer cover has a Shore D hardness in the range of 55 to 70.

In one particular embodiment, as shown in FIGS. 2 and 3, the respective covers (14, 20) are single-layered covers each having a thickness of about 0.035 inches to about 0.015 inches or less. In a second version, as shown in FIG. 4, the cover constitutes two layers. The non-dimpled inner cover layer (30) may be made of a conventional thermoplastic or thermoset material such as an ethylene-based copolymer ionomer as described above. Meanwhile, the dimpled outer cover layer (32) may be made of ULMI polymer composition of this invention. Alternatively, each of the inner and outer cover layers (30, 32) may be made of the ULMI polymer composition of this invention.

Referring to FIG. 4, the inner cover (30) normally has a thickness in the range of about 0.02 to about 0.50 inches and Shore D material hardness in the range of about 50 to about 70. In one embodiment, the inner cover (30) and outer cover (32) have different hardness levels. That is, there is a hardness gradient across the inner cover and outer covers (30, 32). For example, the inner cover (30) may have a Shore D hardness of 65 to 80, preferably 70 to 75; while the outer cover (32) may have a Shore D hardness of 50 to 65, more preferably 60 to 65. In a second embodiment, the inner and outer cover layers (30, 32) have the same hardness level. For example, the inner and outer cover layers each may have a hardness level of 65 to 70. In one embodiment, the inner cover (30) and outer cover (32) may have approximately the same thickness. For example, the inner and outer cover layers each may have a thickness in the range of about 0.015 to about 0.030 inches. In a second embodiment, the thickness of the inner cover (30) is greater than about 0.020 inches, while the thickness of the outer cover (32) is less than about 0.020 inches.

The cores and intermediate layers of the golf balls can be made using conventional injection or compression molding techniques. For example, the composition used to form the casing (intermediate layer) can be placed into a compression mold and molded under sufficient pressure, temperature, and time to produce semi-cured, semi-rigid half shells. The smooth-surfaced hemispherical shells are then placed around the core in a second compression mold. With sufficient heating and pressure, the shells fuse together to form a unitary casing layer around the core. Such compression molding techniques are known in the art and can be used to make the intermediate layers. However, because of the relatively poor flow characteristics of the ULMI materials and thin nature of the outer cover layers, there are numerous drawbacks with using traditional compression or injection molding techniques in the present invention.

For example, if such conventional molding methods are used, the thickness of the cover layer is likely to be non-uniform. There can be uneven or incomplete coverage of the underlying layers. If there is poor coverage, the underlying layers of the golf ball may be exposed and this can detrimentally affect playing performance properties. Moreover, there can be core deformation caused by the high pressures used in conventional compression and injection molding. Such molding methods are generally ineffective for making the thin ULMI polymer cover layers of this invention. Instead, in accordance with this invention, it has been found that thin ULMI polymeric cover layers can be made using certain in-mold powder coating techniques as described above.

The resulting golf ball has a unique combination of properties. The cover layer formed by the method of this invention is thin and has uniform thickness. At the same time, the cover is durable and tough. The thin cover layer of the ULMI polymer provides the ball with good durability, toughness, and cut/tear-resistance. In addition, the cover layer helps impart high resiliency to the golf balls. Preferably, the golf ball has a COR of at least 0.750 and more preferably at least 0.800 (as measured per the test methods below.) This allows players to generate greater ball velocity off the tee and achieve greater distance. At the same time, the relatively thin cover layers means that a player will have a more comfortable and natural feeling when striking the ball with a club. The ball is more playable and its flight path can be controlled more easily. This control allows the player to make better approach shots near the green.

The ULMI polymer composition of this invention may be used with any type of ball construction known in the art. Such golf ball designs include, for example, two-piece, three-piece, and four-piece designs as shown in FIGS. 1-5. The core, intermediate (casing), and cover portions making up the golf ball each can be single or multi-layered depending upon the desired playing performance properties. In preferred embodiments, the ULMI composition of this invention is used to form a thin outer cover layer having improved impact durability while providing a soft and natural feeling when the ball is struck with a club. In other embodiments, the ULMI composition may be used to form an intermediate layer. That is, the ULMI composition may be used in any golf ball construction per this invention so long as at least one layer comprises the composition.

Test Methods

Hardness: The surface hardness of a golf ball layer or other spherical surface is obtained from the average of a number of measurements taken from opposing hemispheres, taking care to avoid making measurements on the parting line of the core or on surface defects such as holes or protrusions. Hardness measurements are made pursuant to ASTM D-2240 "Indentation Hardness of Rubber and Plastic by Means of a Durometer." Because of the curved surface of the golf ball layer, care must be taken to ensure that the golf ball or golf ball subassembly is centered under the durometer indentor before a surface hardness reading is obtained. A calibrated digital durometer, capable of reading to 0.1 hardness units, is used for all hardness measurements and is set to take hardness readings at 1 second after the maximum reading is obtained. The digital durometer must be attached to and its foot made parallel to the base of an automatic stand. The weight on the durometer and attack rate conforms to ASTM D-2240.

It should be understood there is a fundamental difference between "material hardness" and "hardness as measured directly on a golf ball." For purposes of the present invention, material hardness is measured according to ASTM D-2240 and generally involves measuring the hardness of a flat "slab" or "button" formed of the material. Surface hardness, as measured directly on a golf ball (or other spherical surface), typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other.

Coefficient of Restitution (COR) In the present invention, COR is determined according to a known procedure, wherein a golf ball or golf ball subassembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. The COR is then calculated as the ratio of the ball's outgoing transit time period to the ball's incoming transit time period ($COR=V_{out}/V_{in}=T_{in}/T_{out}$).

It should be understood that the multi-layered golf balls described and illustrated herein represent only presently preferred embodiments of the invention. It is appreciated by those skilled in the art that various changes can be made without departing from the spirit and scope of this invention. It is intended that all such embodiments be covered by the appended claims.

We claim:

1. A method for molding a multi-layered golf ball, comprising the steps of:
    coating a powder composition comprising a blend of first and second ultra-low melt index ionomer copolymers of α-olefin, $C_3$ to $C_8$ α, β-ethylenically unsaturated mono- or dicarboxylic acid, and optional softening monomer, each ionomer copolymer having acid groups, wherein 70% to 100% of the acid groups are neutralized in the first ionomer copolymer and 20% to 70% of the acid groups are neutralized in the second ionomer copolymer, to interior surfaces of upper and lower mold members, the upper and lower mold members defining a mold cavity, wherein the surfaces of the upper and lower mold cavities have dimple patterns;
    placing a golf ball subassembly comprising a core of at least one layer into the mold cavity, wherein the interior surfaces of the mold members and surface of the ball subassembly have been pre-treated with an amino-silane agent;
    applying heat and pressure to the mold members so the powder composition fuses and encapsulates the subassembly and forms an outer cover having a dimpled pattern, the cover comprising the blend of ultra-low melt index ionomer copolymers; and
    removing the molded, multi-layered golf ball from the mold cavity.

2. The method of claim 1, wherein the ionomer copolymer is a E/X/Y copolymer, wherein E is ethylene; X is a $C_3$ to $C_8$ α, β-ethylenically unsaturated mono- or dicarboxylic acid; and Y is a softening monomer.

3. The method of claim 2, wherein the copolymer is selected from the group consisting of ethylene/(meth)acrylic acid/n-butyl acrylate; ethylene/(meth)acrylic acid/ethyl acrylate; and ethylene/(meth)acrylic acid/methyl acrylate copolymers.

4. The method of claim 1, wherein the acid moieties of the ionomer copolymer are neutralized greater than 90%.

5. The method of claim 1, wherein the golf ball subassembly comprises a single layer core.

6. The method of claim 5, wherein the core is prepared from polybutadiene rubber.

7. The method of claim 1, wherein the golf ball subassembly comprises a dual-layer core.

8. The method of claim 1, wherein the cover comprising the ultra-low melt index thermoplastic polymer is the outer cover of the golf ball.

9. The method of claim 1, wherein the cover comprising the ultra-low melt index thermoplastic polymer is the inner cover of the golf ball.

10. The method of claim 1, wherein the golf ball further comprises an intermediate layer formed of a material selected from the group consisting of ethylene-based ionomer copolymers; polyesters; polyamides; polyamide-ethers, polyamide-esters; polyurethanes, polyureas, polyurethanes, polyureas; fluoropolymers; polystyrenes; polypropylenes and polyethylenes; polyvinyl chlorides; polyvinyl acetates; polycarbonates; polyvinyl alcohols; polyethers; polyimides, polyetherketones, polyamideimides; and mixtures thereof.

11. The method of claim 8, wherein the outer cover has a thickness of less than about 0.030 inches.

12. The method of claim 8, wherein the outer cover has a thickness of less than about 0.020 inches.

13. The method of claim 8, wherein the outer cover has a thickness of less than about 0.010 inches.

14. The method of claim 8, wherein the outer cover has a Shore D material hardness in the range of about 55 to about 70.

15. The method of claim 1, further comprising the step of pre-heating the golf ball subassembly.

16. The method of claim 1, further comprising the step of treating the golf ball subassembly with corona treatment, plasma treatment or coupling agent.

17. The method of claim 1, further comprising the step of treating the golf ball subassembly by vibrating.

* * * * *